(12) United States Patent
Harris et al.

(10) Patent No.: US 6,978,332 B1
(45) Date of Patent: Dec. 20, 2005

(54) VXS MULTI-SERVICE PLATFORM SYSTEM WITH EXTERNAL SWITCHED FABRIC LINK

(75) Inventors: Jeffrey M. Harris, Chandler, AZ (US); Robert C. Tufford, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 36 days.

(21) Appl. No.: 10/884,414

(22) Filed: Jul. 2, 2004

(51) Int. Cl.$^7$ ............................ G06F 13/00; G06F 3/00
(52) U.S. Cl. ......................... 710/300; 710/2; 710/301
(58) Field of Search .............................. 710/300–301, 710/316–317, 305, 2, 38; 370/351, 360, 362, 370/396; 709/217–218

(56) References Cited

U.S. PATENT DOCUMENTS

| | | | |
|---|---|---|---|
| 5,488,541 A * | 1/1996 | Mistry et al. ............... | 361/788 |
| 6,526,446 B1 * | 2/2003 | Yang et al. .................. | 709/230 |
| 2002/0077112 A1 * | 6/2002 | McIntosh et al. ........... | 455/453 |
| 2003/0051088 A1 * | 3/2003 | Ho et al. ..................... | 710/300 |
| 2003/0236920 A1 * | 12/2003 | Harris et al. ................ | 709/253 |
| 2004/0078506 A1 * | 4/2004 | Wong et al. ................ | 710/301 |

OTHER PUBLICATIONS

Hosking, Rodger. "VXS: Switched Serial Gigabit Fabric for VMEbus." TechOnLine. Sep. 23, 2003. Retrieved from Internet Oct. 29, 2004. <http://www.techonline.com/communicty/related_content/28747>.*

Reid, Shannon. "VMEbus Switched Serial Standard Ratified." Dot21 Real Time Systems. Jan. 21, 2003. Retrieved from Internet Oct. 29, 2004. <http://www.dot21rts.com/pressstuff/vxs_release/VXS_release_4.html>.*

Harris, Jeffrey M. "VXS offers switched serial fabric path." EETimes. Jul. 15, 2002. Retrieved from Internet Oct. 29, 2004. <http://www.eet.com/in_focus/embedded_systems/OEG20020715S0040>.*

Heckman, Melissa. "VITA 41—VXS Backplane Introduction." Bustronic Quarterly e-Newsletter. Apr. 2003. Retrieved from Internet Oct. 29, 2004. <http://www.bustronic.com/Q3/Q2_2003_1.html>.*

"Bustronic Releases VXS Switched Serial Backplanes." Bustronic. Mar. 17, 2004. Retrieved from Internet Oct. 29, 2004. <http://www.bustronic.com/release/040317.htm>.*

Moll, Justin. "Article—VME Backplanes & Accessories Macking Life Easy for Designers." Bustronic. Nov. 2002. Retrieved from Internet Nov. 1, 2004. <http://www.bustronic.com/release/articles/VME-Nov02.htm>.*

(Continued)

Primary Examiner—Khanh Dang
Assistant Examiner—Thomas J. Cleary
(74) Attorney, Agent, or Firm—Kevin D. Wills

(57) ABSTRACT

A VXS multi-service platform system (100) includes a VXS computer chassis (103), a monolithic backplane (102) in the VXS computer chassis having a VMEbus network (108) on the monolithic backplane and a switched fabric (110) operating coincident with the VMEbus network on the monolithic backplane. A switched fabric link (260) extends the switched fabric external to the VXS computer chassis and the monolithic backplane.

10 Claims, 3 Drawing Sheets

OTHER PUBLICATIONS

Harris, Jeffrey M. "The shocking truth about VXS." VMEbus Systems. Aug. 2003. Retrieved from Internet Oct. 29, 2004. <http://vmebus-systems.com/columns/VME%20Renaissance/current/index.shtml>.*

Munroe, Michael. "Backplane design moves to center stage." Planet Analog. Mar. 10, 2003. Retrieved from Internet Oct. 29, 2004. <http://www.planetanalog.com/showArticle.jhtml?articleID=18311760>.*

Sherman, Jon. "An Extension of the VITA 41.0 and VITA 41.2 Standards to Include 9U VME Boards." Raytheon. Jun. 13, 2003. Retrieved from Internet Nov. 1, 2004. <http://www.vita.com/vso/vso200307/23-Wed/1445-VITA%2041.2%209U%20extension.ppt>.*

Harris, Jeffrey M. "VXS: VMEbus Switched Serial." Motorola. Aug. 27, 2003. Retrieved from Internet Oct. 29, 2004. <http://web.archive.org/web/20030827184941/http://www.ll.mit.edu/HPEC/agendas/proc02/pdfs/6.2-harris.PDF>.*

Harris, Jeffrey M. "VME Renaissance." Motorola. Jan. 8, 2002.*

Tufford, Bob. "Motorola's MVME6100 The First VME Renaissance Masterpiece."*

"VITA 41.x—VXS: Adding High Performance Switch Fabrics to VME Based Systems." HTF125. Hybricon.*

Harris, Jeffrey M. "The VME Renaissance." White Paper. Motorola. Jan. 16, 2002.*

"VMEbus Switched Serial Standard Ratified." ForRelease.com. Jan. 20, 2003. Retrieved from Internet Nov. 1, 2004. <http://www.forrelease.com/D20030120/nym022.P2.01192003113307.18172.html>.*

"VITA 41.x VXS Switch Fabric Backplanes." Hybricon.*

"VSO Minutes Wednesday, Sep. 22, 2004." VMEbus International Trade Association. Sep. 22, 2004. Retrieved from Internet Nov. 1, 2004. <http://www.vita.com/vso/vso200409/vm200409.html>.*

"VITA-41 StarFabric Request for Working Group." Sep. 12, 2002.*

"VXS VMEbus Switched Serial Standard VITA 41.0-200x." Revision 1.6. Jan. 19, 2003.*

"VXS Serial RapidIO Protocol Layer Standard VITA 41.2-200x." Revision 1.7. Feb. 4, 2003.*

"VXS Infiniband Protocol Layer Standard VITA 41.1-200x." Revision 1.4. Aug. 7, 2002.*

"VITA-Open Systems." The VMEbus International Trade Association Webpage. Retrieved from Internet Nov. 1, 2004. <http://www.vita.com>.*

"VSO Draft Standards." The VMEbus International Trade Association Webpage. Nov. 26, 2003. Retrieved from Internet Nov. 1, 2004. <http://www.vita.com/draft_stds.html>.*

Rynearson, John. "VITA Brings Together Industry Experts to Further VXS and PMC Standards." PRWeb. Oct. 3, 2004. Retrieved from Internet Nov. 2, 2004. <http://www.prweb.com/releases/2004/10/prweb164023.htm>.*

"Hp hyperfabric hp hyperfabric2". Hewlett-Packard Company. 2002.*

"Oracle 9i Real Application Clusters Using HyperFabric on Hewlett-Packard Platforms". Technical White Paper. Hewlett-Packard Company. Jun. 2001.*

* cited by examiner

VXS MULTI-SERVICE PLATFORM SYSTEM WITH EXTERNAL SWITCHED FABRIC LINK

BACKGROUND OF THE INVENTION

In current embedded computer platforms, such as VERSAmodule Eurocard (VMEbus) systems, the shared multi-drop bus can only be used to support one simultaneous communication between modules in the network. However, some applications have requirements for simultaneous high bandwidth transfers between modules in the VMEbus system that cannot be handled by the shared multi-drop architecture of VMEbus. It is desirable to configure current VMEbus systems to accommodate high-speed data transfers while maintaining the existing VMEbus network architecture. The VERSAmodule Eurocard (VMEbus) switched serial standard backplane (VXS) provides a parallel multi-drop bus on the same backplane as a high-speed switched fabric. The prior art has the disadvantage in that the switched fabric is limited to use in a single chassis on a single backplane.

Accordingly, there is a significant need for an apparatus and method that overcomes the deficiencies of the prior art outlined above.

BRIEF DESCRIPTION OF THE DRAWINGS

Referring to the drawing.

Figure 1:
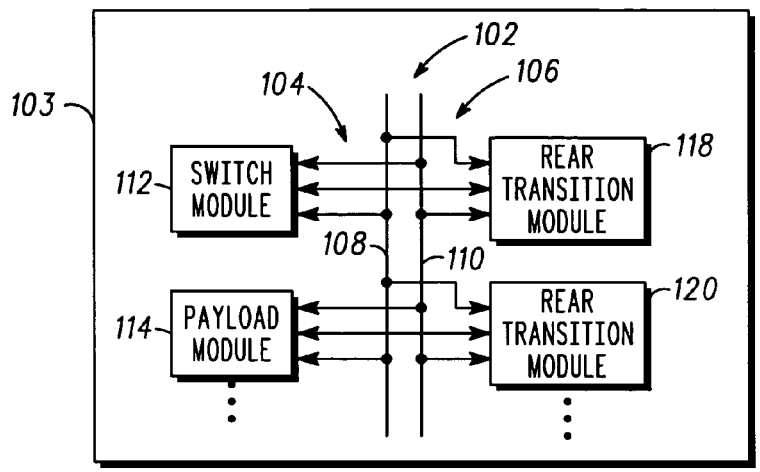
FIG. 1 depicts a VXS multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a VXS multi-service platform system 100 according to one embodiment of the invention. A VXS multi-service platform system 100 can include one or more computer chassis, with software and any number of slots for inserting payload module 114, switch module 112, and rear transition modules 118, 120. Modules can add functionality to VXS multi-service platform system 100 through the addition of processors, memory, storage devices, device interfaces, network interfaces, and the like. In one embodiment a backplane connector is used for connecting modules placed in the slots. In an embodiment, VXS multi-service platform system 100 is an embedded, distributed processing computer system.

In an embodiment, VXS multi-service platform system 100 comprises an embedded-type computer system having a single chassis supporting a monolithic backplane 102 and further comprising individual slots. In this embodiment, monolithic backplane 102 includes a single backplane in a single VXS computer chassis 103. In an embodiment, slots on the front portion 104 of the monolithic backplane 102 are coupled for receiving switch module 112 and payload module 114 that plug into the monolithic backplane 102. In an embodiment, slots on the rear portion 106 of monolithic backplane 102 are coupled for receiving rear transition modules 118, 120 that also plug into the monolithic backplane 102. In an embodiment, each payload module and rear transition module can have a standardized form factor including physical dimensions, electrical connections, and the like as specified in an industry standard specification, for example VERSAmodule Eurocard (VMEbus), VXS, and the like, as described further below.

As an example of an embodiment, VXS multi-service platform system 100 can include VXS computer chassis 103 and one or more modules conforming to the VERSAmodule Eurocard (VMEbus) switched serial standard backplane (VXS) as set forth in VITA 41 promulgated by VMEbus International Trade Association (VITA), P.O. Box 19658, Fountain Hills, Ariz., 85269. VXS multi-service platform system 100 includes a packet switched network, known as a switched fabric 110 and a VMEbus network 108, both located on monolithic backplane 102. In other words, a VXS multi-service platform system 100 includes switched fabric 110 coincident with VMEbus network 108 on monolithic backplane 102.

In an embodiment, VXS multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by a processor. Platform controller can be contained in one, or distributed among two or more payload modules with communication among the various modules of VXS multi-service platform system 100.

Switched fabric 110 allows all payload modules equipped to communicate with the switched fabric to be coupled to all other payload modules similarly equipped. Switched fabric 110 operating on monolithic backplane 102 can use a switch module 112 as a central switching hub with any number of payload modules 114 coupled to switch module 112. Although FIG. 1 depicts switched fabric 110 as a bus for diagrammatic ease, switched fabric 110 may in fact be a star topology, mesh topology, and the like as known in the art for communicatively coupling switched fabrics. Switched fabric 110 can be based on a point-to-point, switched input/output (I/O) fabric, whereby cascaded switch devices interconnect end node devices. In an embodiment, switched fabric 110 supports data transfer at multi-gigabyte rates, for example data transfer in excess of two gigabytes per second. Monolithic backplane 102 can be implemented by using one or more of a plurality of switched fabric protocols, for example and without limitation, InfiniBand™, Serial RapidIO™, FibreChannel™, Ethernet™, PCI Express™, Universal Serial Bus (USB), Serial AT Attachment (Serial ATA), Serial Attached Small Computer System Interface (Serial Attached SCSI), and the like. Monolithic backplane 102 is not limited to the use of these switched fabric protocols and the use of any switched fabric protocol is within the scope of the invention.

VMEbus network 108 is a parallel multi-drop bus network that is known in the art. VMEbus network 108 is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network 108 can include VMEbus based protocols such as Single Cycle Transfer protocol (SCT), Block Transfer protocol (BLT), Multiplexed Block Transfer protocol (MBLT), Two Edge VMEbus protocol (2 eVME) and Two Edge Source Synchronous Transfer protocol (2eSST). VMEbus network 108 is not limited to the use of these VMEbus based protocols and other VMEbus based protocols are within the scope of the invention.

In an embodiment of the invention, VMEbus network 108 and switched fabric 110 operate concurrently within VXS multi-service platform system 100. In one embodiment, switched fabric 110 operates in parallel with VMEbus network 108 in a VXS multi-service platform system 100.

In an embodiment, payload module 114 and rear transition modules 118, 120 can have a physical form factor including physical dimensions, electrical connections, and the like as set forth in the ANSI/VITA 1-1994 and ANSI/ITA 1.1-1997 standards.

In an embodiment, rear transition modules 118, 120 can be used to interface VXS computer chassis 103 to external networks, chassis, devices, and the like. For example, rear transition modules 118, 120 can be used to interface VXS computer chassis 103 to other chassis, other networks such as Ethernet, the Internet, and the like. Also, rear transition modules 118, 120 can be used to interface VXS multi-service platform system 100 with devices such as storage drives, memory, processors, and the like.

In an embodiment, each rear transition module can have a corresponding payload module or corresponding switch module. For example, rear transition module 120 has corresponding payload module 114. Also, rear transition module 118 has corresponding switch module 112. In an embodiment, within VXS computer chassis 103, rear transition module is substantially coplanar to its corresponding payload module or corresponding switch module. This can mean that rear transition module coupled to rear portion 106 of monolithic backplane 102 is substantially in the same plane as its corresponding payload module or corresponding switch module coupled to the front portion 104 of monolithic backplane 102.

In an embodiment, rear transition module 120 can be coupled directly to switched fabric 110 and/or VMEbus network 108. Also, rear transition module 120 can be coupled to corresponding payload module 114 through monolithic backplane 102. In the embodiment shown, rear transition module 120 is shown coupled to VMEbus network 108, switched fabric 110 and payload module 114. This is not limiting of the invention as rear transition module 120 can be coupled to any combination of VMEbus network 108, switched fabric 110 and payload module 114 and be within the scope of the invention.

In another embodiment, rear transition module 118 is coupled to corresponding switch module 112 through monolithic backplane 102. Rear transition module 118 can also be coupled to VMEbus network 108 and/or switched fabric 110. In the embodiment shown, rear transition module 118 is shown coupled to VMEbus network 108, switched fabric 110 and switch module 112. This is not limiting of the invention as rear transition module 118 can be coupled to any combination of VMEbus network 108, switched fabric 110 and switch module 112 and be within the scope of the invention.

Figure 2:
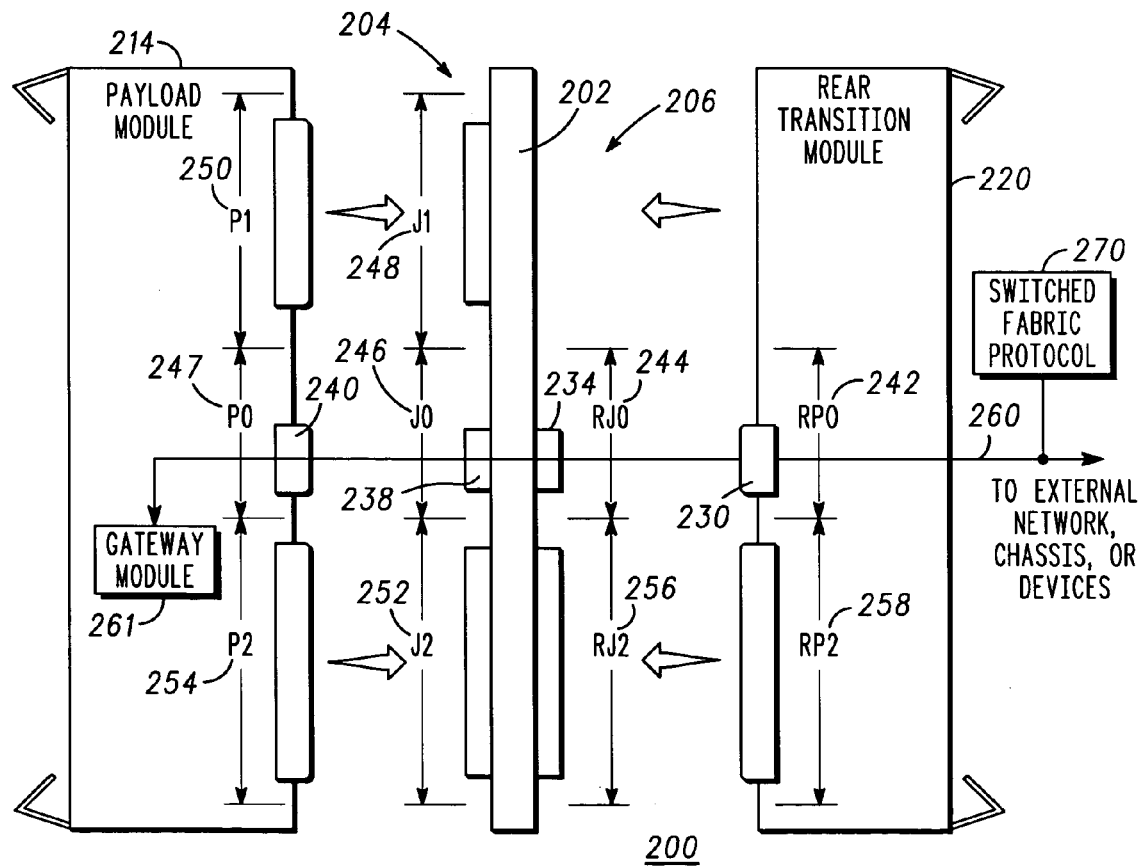
FIG. 2 depicts a VXS multi-service platform system according to an embodiment of the invention.

FIG. 2 depicts a VXS multi-service platform system 200 according to an embodiment of the invention. In an embodiment of the invention, monolithic backplane 202 and payload module 214 have a set of interlocking connectors designed to interlock with each other when payload module 214 is placed in a slot of VXS multi-service platform system 200. Payload module 214 is coupled to interface with front portion 204 of monolithic backplane 202. Mechanical and electrical specifications for a portion of these interlocking connectors can be found in the ANSI/VITA 1-1994 and ANSI/VITA 1.1-1997 and the VITA 41 standards cited above for VMEbus systems. For example, these standards define P0 mechanical envelope 247, P1 mechanical envelope 250, and P2 mechanical envelope 254 on payload module 214. These standards further define corresponding J0 mechanical envelope 246, J1 mechanical envelope 248, and J2 mechanical envelope 252 on monolithic backplane 202. Connectors in the P0/J0, P1/J1 and P2/J2 mechanical envelopes can interlock when payload module 214 is placed in a slot of VXS multi-service platform system 200.

In an embodiment, payload module 214 has one portion of an interlocking connector in the P1 mechanical envelope 250 designed to interlock with its corresponding portion located in the J1 mechanical envelope 248 on monolithic backplane 202. Also, payload module 214 can have an interlocking connector in the P2 mechanical envelope 254 designed to interlock with its corresponding portion located in the J2 mechanical envelope 252 on monolithic backplane 202.

In an embodiment of the invention, connectors in the P1/J1 and P2/J2 mechanical envelopes are for coupling VMEbus network 108 to payload module 214, while the connector in P0/J0 mechanical envelope is for coupling switched fabric 110 to payload module 214. When payload module 214 is placed in a slot and coupled to monolithic backplane 202 via connectors in the P1/J1 and P2/J2 mechanical envelopes, the functionality of payload module 214 is added to VXS multi-service platform system 200 via VMEbus network 108. For example, processors, memory, storage devices, I/O elements, and the like, on payload module 214 are accessible by other payload modules in VXS multi-service platform system 200 and vice versa. When payload module 214 is placed in a slot and coupled to monolithic backplane 202 via a connector in the P0/J0 mechanical envelopes, the functionality of payload module 214 is added to VXS multi-service platform system 200 via switched fabric 110.

In this embodiment, payload module 214 can have payload module connector 240 in the P0 mechanical envelope 247 as defined in the VXS specification above. Monolithic backplane 202 can include payload connector 238 in the J0 mechanical envelope 246, where the payload module connector 240 and the payload connector 238 are designed to interface and interlock when payload module 214 is inserted into VXS multi-service platform system 200. In an embodiment, payload module connector 240 and payload connector 238 can be electrical, optical, radio frequency, biological, and the like, type connectors. In an embodiment, payload module connector 240 and payload connector 238 are designed for use in high-speed switched fabrics and are compatible with any of a plurality of switched fabric protocols 270 discussed above. Switched fabric 110 on monolithic backplane 202 operates using any of switched fabric protocols 270.

In an example of an embodiment of the invention, payload module connector 240 in the P0 mechanical envelope 247 and payload connector 238 in the J0 mechanical envelope 246 can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network standards is encompassed within the invention.

In the embodiment depicted in FIG. 2, VXS multi-service platform system 200 can include rear transition module 220 coupled to interface with rear portion 206 of monolithic backplane 202. In an embodiment, rear transition module 220 is substantially coplanar with corresponding payload module 214.

In an embodiment of the invention, monolithic backplane 202 and rear transition module 220 have a set of interlocking connectors designed to interlock with each other when rear transition module 220 is placed in a slot of VXS multi-service platform system 200. Rear transition module 220 is coupled to interface with rear portion 206 of monolithic backplane 202. Mechanical and electrical specifications for a portion of these interlocking connectors can be found in the ANSI/VITA 1-1994 and ANSI/VITA 1.1-1997 and the VITA 41 standards cited above for VMEbus systems. For example, these standards define RP0 mechanical envelope 242, and RP2 mechanical envelope 258 on rear transition module 220. These standards further define corresponding RJ0 mechanical envelope 244, and RJ2 mechanical envelope 256 on monolithic backplane 202. Connectors in the RP0/RJ0 and RP2/RJ2 mechanical envelopes can interlock when rear transition module 220 is placed in a slot of rear portion 206 of monolithic backplane 202 of VXS multi-service platform system 200.

In an embodiment, rear transition module 220 can have an interlocking connector in the RP2 mechanical envelope 258 designed to interlock with its corresponding portion located in the RJ2 mechanical envelope 256 on the monolithic backplane 202. In an embodiment of the invention, connector in the RP2/RJ2 mechanical envelopes can be for coupling VMEbus network 108 to rear transition module 220 or for coupling corresponding payload module 214 to rear transition module 220.

When rear transition module 220 is placed in a slot and coupled to rear portion 206 of monolithic backplane 202 via connector in the P2/J2 mechanical envelope, the functionality of rear transition module 220 can be added to VXS multi-service platform system 200. This functionality can be added via directly connecting to VMEbus network 108 or by coupling to corresponding payload module 214. For example, I/O elements, and the like, on rear transition module 220 can be accessible by other payload modules in VXS multi-service platform system 200. These I/O elements can access external networks, chassis, devices, and the like, for example, external storage devices, external networks such as the Internet, other VXS computer chassis, and the like.

In another embodiment, the connector in RP0/RJ0 mechanical envelope can be for directly coupling switched fabric 110 to rear transition module 220 or for coupling corresponding payload module 214 to rear transition module 220. When rear transition module 220 is placed in a slot and coupled to rear portion 206 of monolithic backplane 202 via a connector in the RP0/RJ0 mechanical envelopes, the functionality of rear transition module 220 is added to VXS multi-service platform system 200. This functionality can be added via directly connecting to switched fabric 110 or by coupling to corresponding payload module 214. For example, I/O elements, and the like, on rear transition module 220 can be accessible by other payload modules in VXS multi-service platform system 200.

In this embodiment, rear transition module 220 can have connector 230 in the RP0 mechanical envelope 242. Rear portion 206 of monolithic backplane 202 can include corresponding connector 234 in the RJ0 mechanical envelope 244, where the connector 230 and the corresponding connector 234 are designed to interface and interlock when rear transition module 220 is inserted into VXS multi-service platform system 200. In an embodiment, connector 230 and corresponding connector 234 can be electrical, optical, radio frequency, biological, and the like, type connectors. In an embodiment, connector 230 and corresponding connector 234 are designed for use in high-speed switched fabrics and are compatible with any of a plurality of switched fabric protocols discussed above. In an example of an embodiment of the invention, connector 230 in the RP0 mechanical envelope 242 and corresponding connector 234 in the RJ0 mechanical envelope 244 can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network standards is encompassed within the invention.

In an embodiment, switched fabric link 260 can extend switched fabric 110 from monolithic backplane 202, to networks, chassis, devices, and the like, external to VXS computer chassis 103. In the embodiment, shown, switched fabric link 260 extends from payload module 214 through monolithic backplane 202 to rear transition module 220. Switched fabric link 260 then exits VXS computer chassis 103 through rear transition module 220. In an embodiment, switched fabric link 260 can communicatively couple payload module 214 to rear transition module 220. Switched fabric link 260 can extend through payload module connector 240, payload connector 238, corresponding connector 234 and connector 230. Switched fabric link 260 can include any type of medium to communicate data signals using switched fabric protocol 270, for example, copper, optical, and the like.

In an embodiment, switched fabric link 260 can originate at gateway module 261 on payload module 214. Gateway module 261 can be any combination of hardware, software, and the like that processes or creates data signals to or from switched fabric 110. In an embodiment, gateway module 261 is also coupled to switched fabric 110. Gateway module 261 can function to process incoming and outgoing data signals from VXS computer chassis 103 on switched fabric link 260 using switched fabric protocol 270. In effect, gateway module 261 and switched fabric link 260 extend switched fabric 110 from a single VXS computer chassis 103 and monolithic backplane 202, to any number of networks, chassis, devices, and the like, that are external to VXS computer chassis 103 and monolithic backplane 202. In an embodiment, switched fabric 110 and switched fabric link 260 operate using the same switched fabric protocol. In another embodiment, switched fabric 110 communicates with at least one external network, external chassis, external device, and the like through switched fabric link 260 using switched fabric protocol 270.

In the embodiment shown, only one switched fabric link 260 is shown. This is not limiting of the invention. Switched fabric link 260 can be divided into any number of switched fabric links exiting VXS multi-service platform system 200. For example, although not shown in FIG. 2, bridging circuitry can be provided on rear transition module 220 to bridge a copper switched fabric link 260, for example, to any number of optical switched fabric links exiting VXS multi-service platform system 200. In another embodiment, although not shown in FIG. 2, switching circuitry can be provided on rear transition module 220 for a plurality of switched fabric links 260 exiting VXS multi-service platform system 200.

Figure 3:
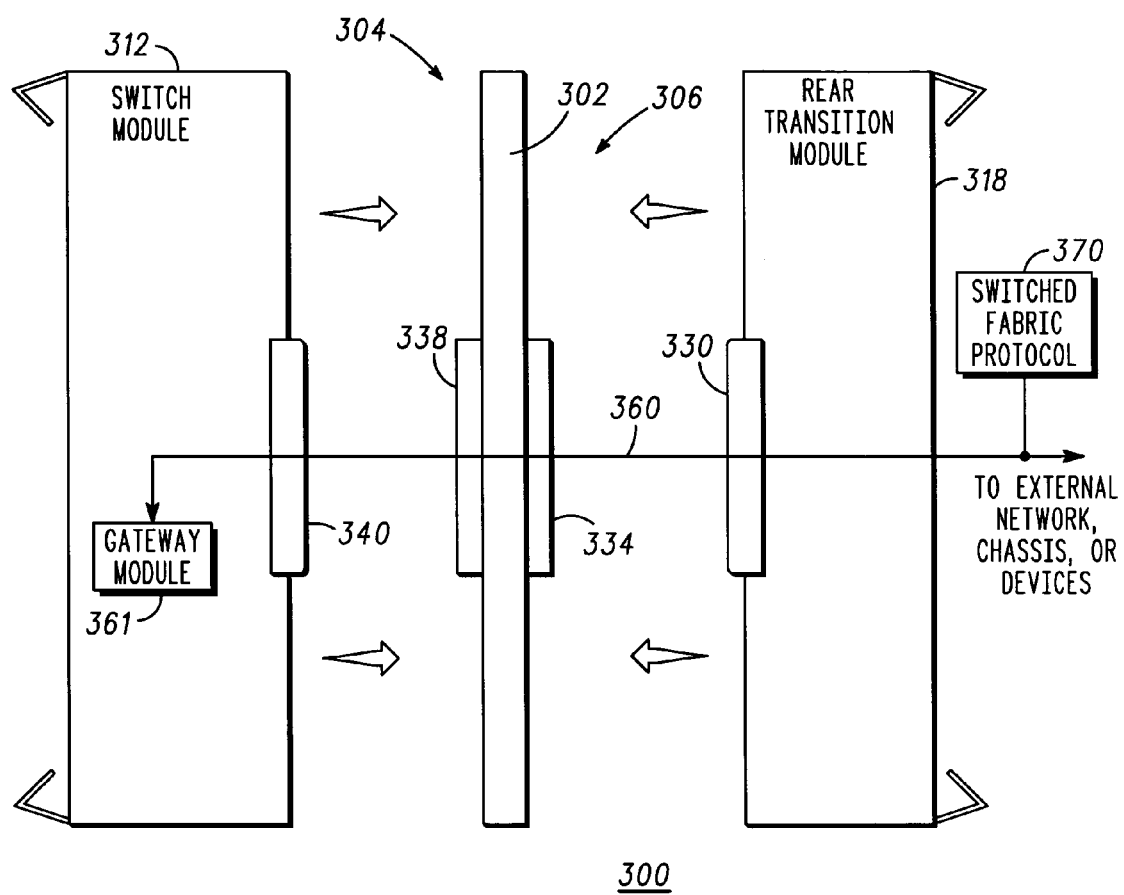
FIG. 3 depicts a VXS multi-service platform system according to another embodiment of the invention.

FIG. 3 depicts a VXS multi-service platform system 300 according to another embodiment of the invention. In an embodiment of the invention, monolithic backplane 302 and switch module 312 have a set of interlocking connectors designed to interlock with each other when switch module 312 is placed in a slot of VXS multi-service platform system 300. Switch module 312 is coupled to interface with front portion 304 of monolithic backplane 302. Mechanical and electrical specifications for a portion of these interlocking connectors can be found in the ANSI/VITA 1-1994 and ANSI/VITA 1.1-1997 and the VITA 41 standards cited above for VMEbus systems.

Switch module 312 can have switch module connector 340 as defined in the VXS specification specified above. Monolithic backplane 302 can include backplane connector 338, where the switch module connector 340 and backplane connector 338 are designed to interface and interlock when switch module 312 is inserted into VXS multi-service platform system 300. In an embodiment, switch module connector 340 and backplane connector 338 can be electrical, optical, radio frequency, biological, and the like, type connectors. In an embodiment, switch module connector 340 and backplane connector 338 are designed for use in high-speed switched fabrics and are compatible with any of a plurality of switched fabric protocols 370 discussed above. Switched fabric 110 on monolithic backplane 302 operates using any of switched fabric protocols 370.

In an example of an embodiment of the invention, switch module connector 340 and backplane connector 338 can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network protocols is encompassed within the invention.

In the embodiment depicted in FIG. 3, VXS multi-service platform system 300 can include rear transition module 318 coupled to interface with rear portion 306 of monolithic backplane 302. In an embodiment, rear transition module 318 is substantially coplanar with corresponding switch module 312.

In an embodiment of the invention, monolithic backplane 302 and rear transition module 318 have a set of interlocking connectors designed to interlock with each other when rear transition module 318 is placed in a slot of VXS multi-service platform system 300. Rear transition module 318 is coupled to interface with rear portion 306 of monolithic backplane 302. Mechanical and electrical specifications for a portion of these interlocking connectors can be found in the ANSI/VITA 1-1994 and ANSI/VITA 1.1-1997 and the VITA 41 standards cited above for VMEbus systems.

In an embodiment, rear transition module 318 can have connector 330. Rear portion 306 of monolithic backplane 302 can include corresponding connector 334, where the connector 330 and the corresponding connector 334 are designed to interface and interlock when rear transition module 318 is inserted into VXS multi-service platform system 300. In an embodiment, connector 330 and corresponding connector 334 can be electrical, optical, radio frequency, biological, and the like, type connectors. In an embodiment, connector 330 and corresponding connector 334 are designed for use in high-speed switched fabrics and are compatible with any of a plurality of switched fabric protocols discussed above. In an example of an embodiment of the invention, connector 330 and corresponding connector 334 can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network protocols is encompassed within the invention.

In an embodiment, the connector 330 and corresponding connector 334 can be for directly coupling switched fabric 110 to rear transition module 318 or for coupling corresponding switch module 312 to rear transition module 318. When rear transition module 318 is placed in a slot and coupled to rear portion 306 of monolithic backplane 302, the functionality of rear transition module 318 is added to VXS multi-service platform system 300. This functionality can be added via directly connecting to switched fabric 110 or by coupling to corresponding switch module 312. For example, I/O elements, and the like, on rear transition module 318 can be accessible by other payload modules and/or switch module 312 in VXS multi-service platform system 300.

In an embodiment, switched fabric link 360 can extend switched fabric 110 from monolithic backplane 302, to networks, chassis, devices, and the like, external to VXS computer chassis 103. In the embodiment, shown, switched fabric link 360 extends from switch module 312 through monolithic backplane 302 to rear transition module 318. Switched fabric link 360 then exits VXS computer chassis 103 through rear transition module 318. In an embodiment, switched fabric link 360 can communicatively couple switch module 312 to rear transition module 318. Switched fabric link 360 can extend through switch module connector 340, backplane connector 338, corresponding connector 334 and connector 330. Switched fabric link 360 can include any type of medium to communicate data signals using switched fabric protocol 370, for example, copper, optical, and the like.

In an embodiment, switched fabric link 360 can originate at gateway module 361 on switch module 312. Gateway module 361 can be any combination of hardware, software, and the like that processes or creates data signals to or from switched fabric 110. In an embodiment, gateway module 361 is also coupled to switched fabric 110. Gateway module 361 can function to process incoming and outgoing data signals from VXS computer chassis 103 on switched fabric link 360 using switched fabric protocol 370. In effect, gateway module 361 and switched fabric link 360 extend switched fabric 110 from a single VXS computer chassis 103 and monolithic backplane 302, to any number of networks, chassis, devices, and the like, that are external to VXS computer chassis 103 and monolithic backplane 302. In an embodiment, switched fabric 110 and switched fabric link 360 operate using the same switched fabric protocol. In another embodiment, switched fabric 110 communicates with at least one external network, external chassis, external device, and the like through switched fabric link 360 using switched fabric protocol 370.

In the embodiment shown, only one switched fabric link 360 is shown. This is not limiting of the invention. Switched fabric link 360 can be divided into any number of switched fabric links exiting VXS multi-service platform system 300. For example, although not shown in FIG. 3, bridging circuitry can be provided on rear transition module 318 to bridge a copper switched fabric link 360, for example, to any number of optical switched fabric links exiting VXS multi-service platform system 300. In another embodiment, although not shown in FIG. 3, switching circuitry can be provided on rear transition module 318 for a plurality of switched fabric links 360 exiting VXS multi-service platform system 300.

Figure 4:
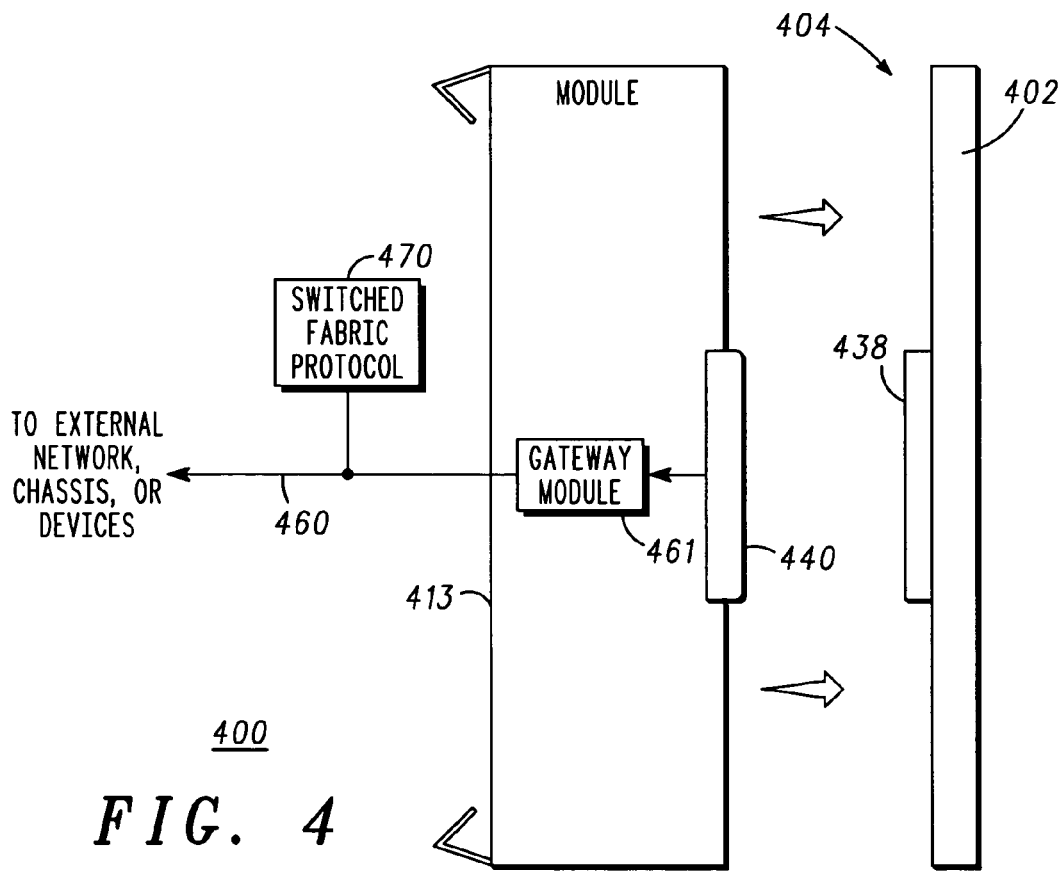
FIG. 4 depicts a VXS multi-service platform system according to yet another embodiment of the invention.

FIG. 4 depicts a VXS multi-service platform system 400 according to yet another embodiment of the invention. As shown in FIG. 4, VXS multi-service platform system 400 can include module 413, which can be one of a switch module or a payload module as described above. Module 413 can couple to front portion 404 of monolithic backplane 402 via one or more module connectors 440 and backplane connectors 438 analogous to those described above.

In an embodiment, module 413 can include switched fabric link 460, which can extend switched fabric 110 from monolithic backplane 402, to networks, chassis, devices, and the like, external to VXS computer chassis 103. Switched fabric link 460 can include any type of medium to communicate data signals using switched fabric protocol 470, for example, copper, optical, and the like.

In an embodiment, switched fabric link 460 can originate at gateway module 461 on module 413. Gateway module 461 can be any combination of hardware, software, and the like that processes or creates data signals to or from switched fabric 110. In an embodiment, gateway module 461 is also coupled to switched fabric 110. Gateway module 461 can function to process incoming and outgoing data signals from VXS computer chassis 103 on switched fabric link 460 using switched fabric protocol 470. In effect, gateway module 461 and switched fabric link 460 extend switched fabric 110 from a single VXS computer chassis 103 and monolithic backplane 402, to any number of networks, chassis, devices, and the like, that are external to VXS computer chassis 103 and monolithic backplane 402. In an embodiment, switched fabric 110 and switched fabric link 460 operate using the same switched fabric protocol. In another embodiment, switched fabric 110 communicates with at least one external network, external chassis, external device, and the like through switched fabric link 460 using switched fabric protocol 470.

In the embodiment shown, only one switched fabric link 460 is shown. This is not limiting of the invention. Switched fabric link 460 can be divided into any number of switched fabric links exiting VXS multi-service platform system 400. For example, although not shown in FIG. 4, bridging circuitry can be provided on module 413 to bridge a copper switched fabric link 460, for example, to any number of optical switched fabric links exiting VXS multi-service platform system 400. In another embodiment, although not shown in FIG. 4, switching circuitry can be provided on module 413 for a plurality of switched fabric links 460 exiting VXS multi-service platform system 400.

Figure 5:
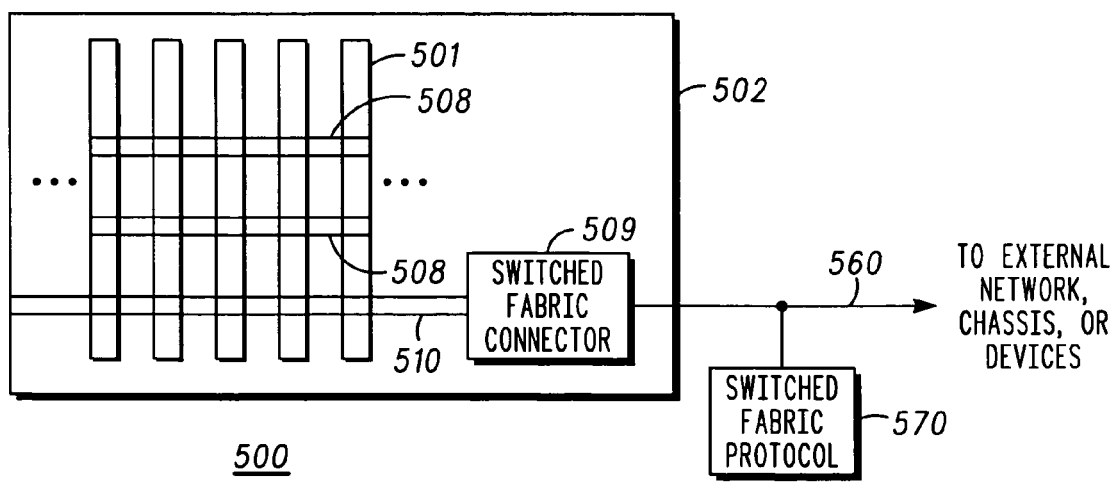
FIG. 5 depicts a VXS multi-service platform system according to still another embodiment of the invention.

FIG. 5 depicts a VXS multi-service platform system 500 according to still another embodiment of the invention. As shown in FIG. 4, VXS multi-service platform system 500 can include monolithic backplane 502 having any number of slots 501 for inserting modules, such as switch modules, payload modules, rear transition modules, and the like as described above.

In an embodiment, each of slots 501 is coupled on monolithic backplane 502 by VMEbus network 508 and switched fabric 510. In an embodiment, monolithic backplane 502 can further include switched fabric connector 509 coupled to interface with switched fabric 510. In an example of an embodiment of the invention, switched fabric connector 509 can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network protocols is encompassed within the invention.

In an embodiment, switched fabric connector 509 can be coupled to interface with a module placed in a slot 501 of VXS multi-service platform system 500. In this embodiment, switched fabric link 560 can extend switched fabric 510, through the module, to external networks, chassis, devices, and the like. Switched fabric connector 509 is coupled to extend switched fabric 510 to networks, chassis, devices, and the like, external to VXS multi-service platform system 500 and monolithic backplane 502.

In another embodiment, switched fabric link 560 can be coupled directly to switched fabric connector 509 to extend switched fabric 510 outside of VXS multi-service platform system without passing through a module.

In an embodiment, switched fabric 510 and switched fabric link 560 operate using the same switched fabric protocol 570. In another embodiment, switched fabric 510 communicates with at least one external network, external chassis, external device, and the like through switched fabric link 560 using switched fabric protocol 570.

In the embodiment shown, only one switched fabric link 560 is shown. This is not limiting of the invention. Switched fabric link 560 can be divided into any number of switched fabric links exiting VXS multi-service platform system 500. For example, although not shown in FIG. 5, bridging circuitry can be provided to bridge a copper switched fabric link 560, for example, to any number of optical switched fabric links exiting VXS multi-service platform system 500. In another embodiment, although not shown in FIG. 5, switching circuitry can be provided for a plurality of switched fabric links 560 exiting VXS multi-service platform system 500.

While we have shown and described specific embodiments of the present invention, further modifications and improvements will occur to those skilled in the art. It is therefore, to be understood that appended claims are intended to cover all such modifications and changes as fall within the true spirit and scope of the invention.

What is claimed is:

1. A VXS multi-service platform system, comprising:
a VXS computer chassis;
a monolithic backplane in the VXS computer chassis;
a VMEbus network on the monolithic backplane;
a switched fabric operating coincident with the VNEbus network on the monolithic backplane; and
a switched fabric link, wherein the switched fabric link extends the switched fabric external to the VXS computer chassis and the monolithic backplane through at least one of a payload module and a rear transition module.

2. The VXS multi-service platform system of claim 1, wherein the payload module is coupled to a front portion of the monolithic backplane, and wherein the rear transition module is coupled to a rear portion of the monolithic backplane, wherein the rear transition module is substantially coplanar with the payload module, wherein the switched fabric link extends from the payload module through the monolithic backplane to the rear transition module, and wherein the switched fabric link exits the VXS computer chassis through the rear transition module.

3. The VXS multi-service platform system of claim 1, further comprising:
a switch module coupled to a front portion of the monolithic backplane, wherein the rear transition module coupled to a rear portion of the monolithic backplane, wherein the rear transition module is substantially coplanar with the switch module, wherein the switched fabric link extending from the switch module through the monolithic backplane to the rear transition module, and wherein the switched fabric link exits the VXS computer chassis through the rear transition module.

4. The VXS multi-service platform system of claim 1, wherein the switched fabric link couples the VXS computer chassis and the monolithic backplane to at least one of an external network, external chassis and external device.

5. The VXS multi-service platform system of claim 1, wherein the switched fabric communicates within the VXS computer chassis on the monolithic backplane using a switched fabric protocol, and wherein the switched fabric communicates with at least one of an external network, external chassis and external device through the switched fabric link using the switched fabric protocol.

6. A method, comprising:
providing a VXS computer chassis having a monolithic backplane;
operating a VMEbus network and a switched fabric coincident on the monolithic backplane; and
extending the switched fabric external to the VXS computer chassis and the monolithic backplane through at least one of a payload module and a rear transition module through a switched fabric link.

7. The method of claim 6, further comprising:
coupling the payload module to a front portion of the monolithic backplane;
coupling the rear transition module to a rear portion of the monolithic backplane, wherein the rear transition module is substantially coplanar with the payload module;
extending the switched fabric link from the payload module through the monolithic backplane to the rear transition module; and
the switched fabric link exiting the VXS computer chassis through the rear transition module.

8. The method of claim 6, further comprising:
coupling a switch module to a front portion of the monolithic backplane;
coupling the rear transition module to a rear portion of the monolithic backplane, wherein the rear transition module is substantially coplanar with the switch module;
extending the switched fabric link from the switch module through the monolithic backplane to the rear transition module; and
the switched fabric link exiting the VXS computer chassis through the rear transition module.

9. The method of claim 6, wherein the switched fabric link couples the VXS computer chassis and the monolithic backplane to at least one of an external network, external chassis and external device.

10. The method of claim 6, further comprising:
the switched fabric communicating within the VXS computer chassis on the monolithic backplane using a switched fabric protocol; and
the switched fabric communicating with at least one of an external network, external chassis and external device through the switched fabric link using the switched fabric protocol.

* * * * *